US012280649B2

(12) United States Patent
Kang et al.

(10) Patent No.: US 12,280,649 B2
(45) Date of Patent: Apr. 22, 2025

(54) VEHICLE FLOOR SYSTEM

(71) Applicants: Hyundai Motor Company, Seoul (KR); Kia Corporation, Seoul (KR)

(72) Inventors: Seung Min Kang, Hwaseong-si (KR); Gyu Gab Hong, Yongin-si (KR); Ki Bong Park, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 432 days.

(21) Appl. No.: 17/749,984

(22) Filed: May 20, 2022

(65) Prior Publication Data

US 2023/0145164 A1  May 11, 2023

(30) Foreign Application Priority Data

Nov. 9, 2021 (KR) .................. 10-2021-0153395

(51) Int. Cl.
```
B60K 1/04       (2019.01)
B62D 21/15      (2006.01)
B62D 25/20      (2006.01)
B62D 27/02      (2006.01)
```

(52) U.S. Cl.
CPC .............. B60K 1/04 (2013.01); B62D 21/15 (2013.01); B62D 25/20 (2013.01); B62D 27/02 (2013.01); *B60K 2001/0438* (2013.01)

(58) Field of Classification Search
CPC .............. B60K 1/04; B60K 2001/0438; B60K 2015/0634; B60Y 2306/01; B62D 21/15; B62D 25/20; B62D 27/02
USPC ........................................................ 180/68.5
See application file for complete search history.

(56) References Cited

U.S. PATENT DOCUMENTS

| | | | |
|---|---|---|---|
| 8,336,658 B2 * | 12/2012 | Rawlinson | B60K 1/04 429/96 |
| 11,370,287 B2 * | 6/2022 | Tsuyuzaki | B62D 21/157 |
| 11,524,606 B2 * | 12/2022 | Lee | B62D 25/20 |
| 11,654,974 B2 * | 5/2023 | Choi | B62D 25/2036 296/193.05 |
| 11,661,114 B2 * | 5/2023 | Choi | B62D 25/20 180/68.5 |
| 2019/0283563 A1 * | 9/2019 | Tatsuwaki | B62D 25/08 |
| 2021/0387550 A1 * | 12/2021 | Lee | B60N 2/012 |
| 2022/0016966 A1 * | 1/2022 | Kecalevic | B62D 25/2036 |

(Continued)

FOREIGN PATENT DOCUMENTS

KR 20210155260 A * 6/2020 ............... B60K 1/04

OTHER PUBLICATIONS

Translation of KR 20210155260A accessed at www.espacenet.com on Sep. 20, 2024. (Year: 2020).*

*Primary Examiner* — James A Shriver, II
*Assistant Examiner* — Hilary L Johns
(74) *Attorney, Agent, or Firm* — Slater Matsil, LLP

(57) ABSTRACT

An embodiment vehicle floor system includes a floor, a pair of side longitudinal members disposed on side edges of the floor, respectively, wherein each side longitudinal member extends in a longitudinal direction of a vehicle and wherein each side longitudinal member includes a horizontal rib provided therein, a structural transverse member disposed on the floor and extending in a transverse direction of the vehicle, wherein the horizontal ribs are aligned with the structural transverse member in the transverse direction of the vehicle, and a battery assembly disposed under the floor.

20 Claims, 7 Drawing Sheets

(56) References Cited

U.S. PATENT DOCUMENTS

| | | | |
|---|---|---|---|
| 2022/0081040 A1* | 3/2022 | Choi | B62D 21/03 |
| 2022/0161867 A1* | 5/2022 | Choi | B62D 25/2036 |
| 2023/0023627 A1* | 1/2023 | Ito | B62D 25/2036 |
| 2023/0036105 A1* | 2/2023 | Langworthy | H01M 50/242 |

* cited by examiner

VEHICLE FLOOR SYSTEM

CROSS-REFERENCE TO RELATED APPLICATIONS

This application claims the benefit of Korean Patent Application No. 10-2021-0153395, filed on Nov. 9, 2021, which application is hereby incorporated herein by reference.

TECHNICAL FIELD

The present disclosure relates to a vehicle floor system.

BACKGROUND

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle is equipped with a battery assembly which is mounted to a vehicle body. The battery assembly includes one or more battery cells (or battery modules), electric/electronic components connected to the battery cells, and a battery case in which the battery cells and the electric/electronic components are mounted. The battery assembly may be mounted under a floor of the vehicle body.

In order to mount the battery assembly under the floor and increase an interior space, the electric vehicle needs to reduce structural members compared to an internal combustion engine vehicle. In addition, it is necessary to reduce the cross-sectional area of each structural member.

In order to increase all electric range (AER) of the electric vehicle, the capacity and size of the battery assembly are gradually increasing. Considering marketability, etc., however, the size of a vehicle bottom structure (including the floor) may not relatively increase to match the increased size of the battery assembly. Accordingly, since it is necessary to increase the capacity of the battery assembly while minimizing the cross-sectional areas of the structural members mounted on the floor and a space between the battery assembly and the vehicle body, an impact absorbing space required for the safety of the battery assembly is relatively decreasing.

As the impact absorbing space is decreasing, various methods for the safety of the battery assembly may be required. For example, in order to ensure the safety of the battery assembly, the structural members may be made of materials having relatively high stiffness or strength (ultra high-tensile strength steel) or various reinforcing members may be additionally provided between the structural members of the vehicle body.

However, even if the structural members are made of materials having high stiffness or strength or various reinforcing members are additionally provided between the structural members in a situation in which the impact absorbing space is decreasing due to an increase in the size of the battery assembly, there is a limit to improving side crash performance. Thus, it may be difficult to sufficiently secure the safety of a passenger compartment and the battery assembly.

The above information described in this background section is provided to assist in understanding the background of the inventive concept, and may include any technical concept which is not considered as the prior art that is already known to those skilled in the art.

SUMMARY

The present disclosure relates to a vehicle floor system. Particular embodiments relate to a vehicle floor system capable of significantly improving side crash performance.

Embodiments of the present disclosure can solve problems occurring in the prior art while advantages achieved by the prior art are maintained intact.

An embodiment of the present disclosure provides a vehicle floor system significantly improving side crash performance, thereby sufficiently securing the safety of a passenger compartment and a battery assembly.

According to an embodiment of the present disclosure, a vehicle floor system may include a floor, a pair of side longitudinal members disposed on both side edges of the floor, a structural transverse member disposed on the floor and extending in a width or transverse direction of a vehicle, and a battery assembly disposed under the floor. Each side longitudinal member may extend in a longitudinal direction of the vehicle, the side longitudinal member may include a horizontal rib provided therein, and the horizontal rib may be aligned with the structural transverse member in the width or transverse direction of the vehicle.

Accordingly, the horizontal rib of the side longitudinal member and the structural transverse member may sufficiently support impact energy (impact load) transferred in the width or transverse direction of the vehicle during a side collision of the vehicle, and thus side crash performance (crashworthiness) of the floor may be significantly improved.

A thickness of the side longitudinal member may increase from the interior side thereof toward the exterior side thereof.

Specifically, the side longitudinal member may include an exterior portion facing the exterior of the vehicle, and an interior portion facing the interior of the vehicle, and a thickness of the exterior portion may be greater than that of the interior portion.

Specifically, the side longitudinal member may include a plurality of vertical ribs extending vertically therein, the plurality of vertical ribs may include a first vertical rib adjacent to the exterior portion, and a second vertical rib adjacent to the interior portion, and a thickness of the first vertical rib may be greater than that of the second vertical rib.

The strength of the side longitudinal member may increase from the interior side thereof toward the exterior side thereof, and accordingly the amount of deformation of the side longitudinal member due to the impact energy during a side collision of the vehicle may increase from the exterior side thereof toward the interior side thereof. Thus, the impact energy may be stably absorbed.

The structural transverse member may include a central web, a first side web connected to the central web through a first interior side wall, a second side web connected to the central web through a second interior side wall, a first flange connected to the first side web through a first exterior side wall, and a second flange connected to the second side web through a second exterior side wall.

The central web, the first flange, and the second flange may be fixed to a top surface of the floor, and the first side web and the second side web may be offset upwardly with respect to the central web.

As the structural transverse member has an M-shaped cross section, the structural transverse member may have enough strength and stiffness.

The first side web and the second side web may be aligned with the horizontal rib of the side longitudinal member in the width or transverse direction of the vehicle.

Accordingly, the pair of side longitudinal members and the structural transverse member may increase transverse stiffness and transverse strength of a vehicle body.

The vehicle floor system may further include an additional transverse member disposed above the structural transverse member, and a top wall of the side longitudinal member may be aligned with the additional transverse member in the width or transverse direction of the vehicle.

Accordingly, the pair of side longitudinal members and the additional transverse member may increase transverse stiffness and transverse strength of the vehicle body.

The additional transverse member may be attached to the structural transverse member so that the additional transverse member and the structural transverse member may form a closed cross section.

Accordingly, the additional transverse member and the structural transverse member may increase stiffness and strength of the vehicle body.

The battery assembly may include a battery case in which a plurality of battery cells are received, a battery cover with which the battery case is covered, at least one battery transverse member disposed in the battery case, and a side mount protruding from an exterior side surface of the battery case toward a side sill and the side longitudinal member.

The side mount may be joined to the corresponding side longitudinal member through a side mounting bolt, and the side mount may be aligned with the battery transverse member in the width or transverse direction of the vehicle.

At least a portion of the side longitudinal member may overlap the side mount of the battery assembly.

Specifically, a deformation section may be defined between an exterior side surface of the side longitudinal member and the exterior side surface of the battery case, and the deformation section may include a first section corresponding to a width of the exterior portion of the side longitudinal member, and a second section in which the interior portion of the side longitudinal member and the side mount overlap vertically.

Since the thickness of the interior portion of the side longitudinal member is less than the thickness of the exterior portion thereof, the strength of the second section may be lower than that of the first section.

The battery assembly may be mounted to the floor through a plurality of fasteners, and each fastener may be mounted in a predetermined position which is ⅓ of a distance between a pair of side sills.

The plurality of fasteners may be mounted at predetermined points (e.g., ⅓ of the distance between the pair of side sills), thereby preventing the floor, the structural transverse member, and the battery transverse member from being deformed (bent) in the event of a side collision of the vehicle. In particular, the battery assembly may be prevented from coming off or being separated from the floor, and thus safety of the battery assembly may be ensured.

The plurality of fasteners may directly connect the battery assembly and the structural transverse member.

The side longitudinal member may be directly mounted on the side edge of the floor, the structural transverse member may be disposed above the floor, and the additional transverse member may be disposed between the structural transverse member and the floor.

A plurality of fasteners may directly connect the battery assembly and the additional transverse member.

The structural transverse member may be disposed below the floor, and a plurality of fasteners may directly connect the battery assembly and the structural transverse member.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
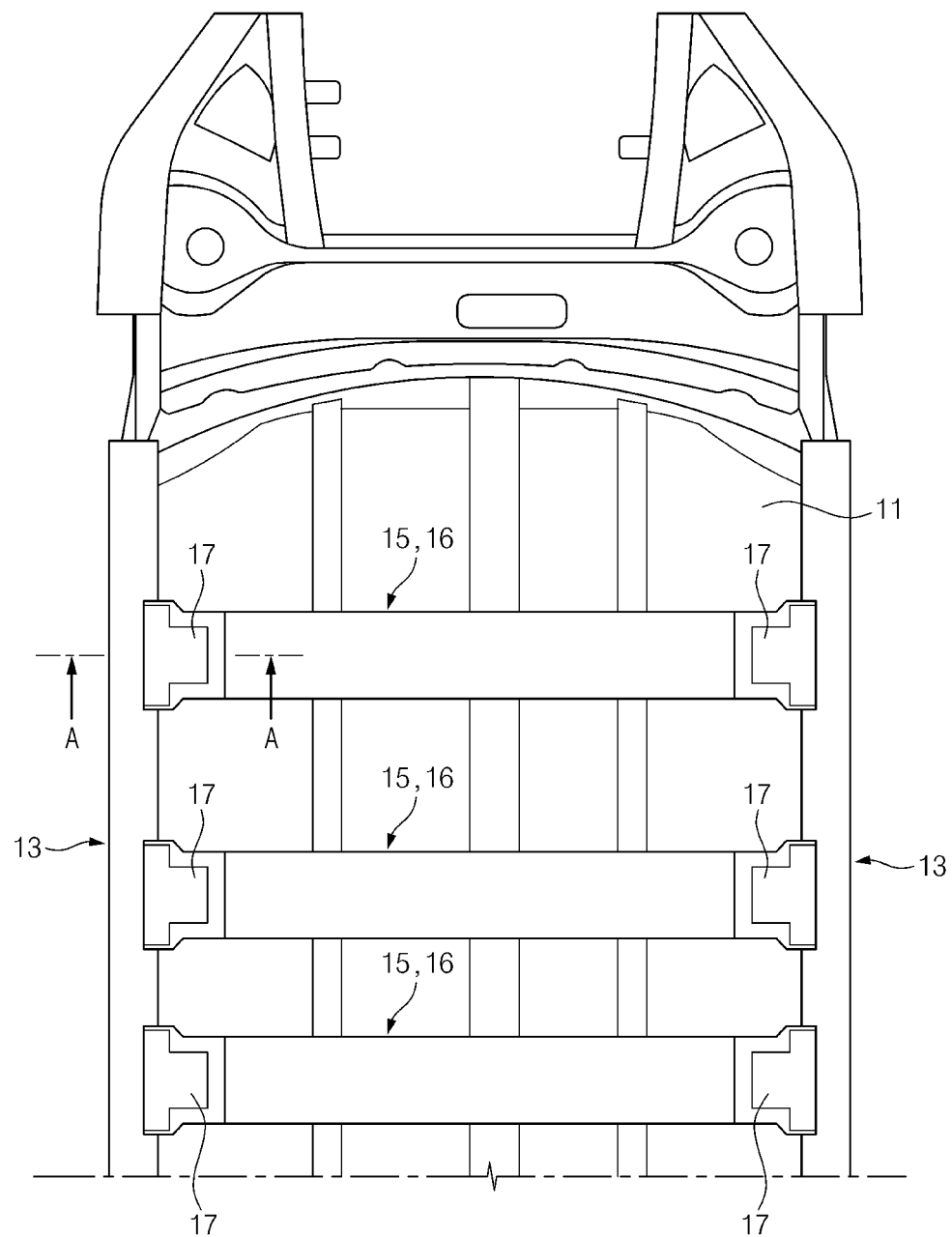
FIG. 1 illustrates a plan view of a vehicle floor system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
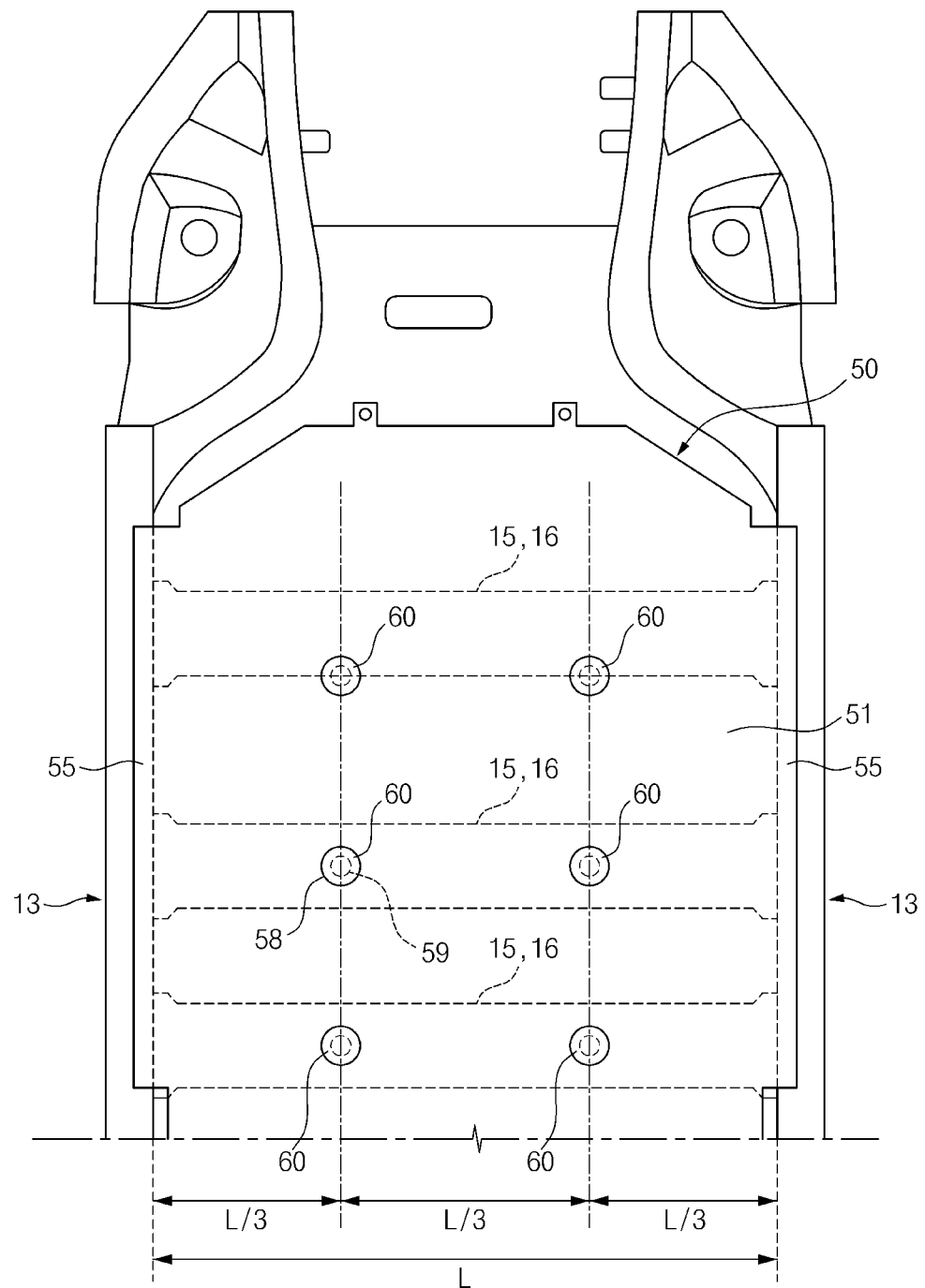
FIG. 2 illustrates a bottom view of a vehicle floor system according to an exemplary embodiment of the present disclosure.
Figure 3:
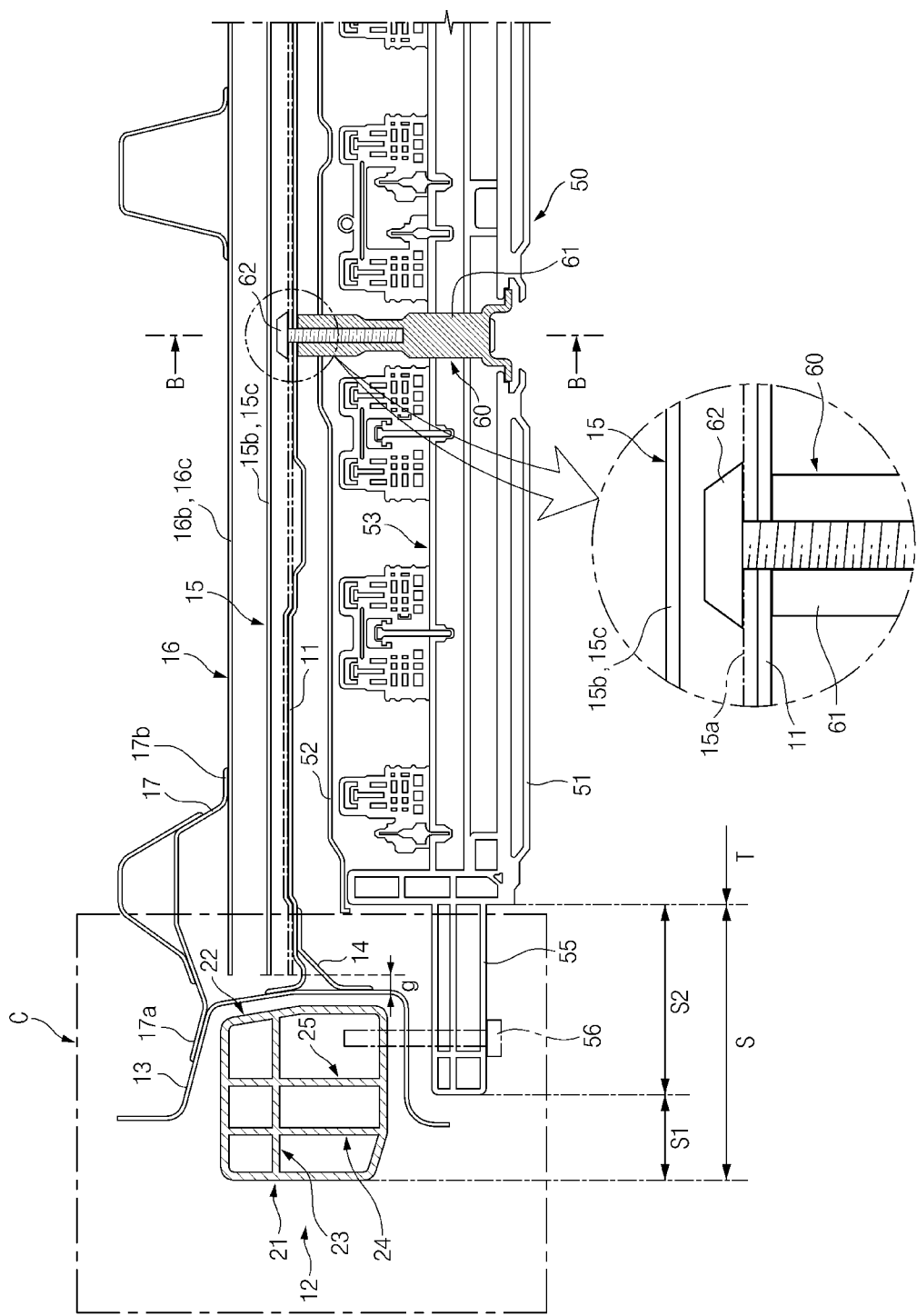
FIG. 3 illustrates a cross-sectional view, taken along line A-A of FIG. 1.

Referring to FIGS. 1 to 3, a vehicle floor system according to an exemplary embodiment of the present disclosure may include a floor 11 disposed on the bottom of a vehicle body.

The floor 11 may define the bottom of a passenger compartment, and support interior components of the passenger compartment such as a plurality of vehicle seats and vehicle mats.

A pair of side longitudinal members 12 may be disposed on both side edges of the floor 11, and each side longitudinal member 12 may extend in a longitudinal direction of the vehicle.

Referring to FIGS. 1 to 3, a pair of side sills may be disposed along both side edges of the floor 11, and each side sill may extend in the longitudinal direction of the vehicle. Each side sill may include a side sill inner 13 facing the interior of the vehicle (that is, a central longitudinal axis of the floor 11) and a side sill outer (not shown) facing the exterior of the vehicle. The side sill outer (not shown) may be joined to the side sill inner 13 using fasteners, welding, and/or the like. Each side sill inner 13 may be connected to each side edge of the floor 11 through a mounting bracket 14.

According to an exemplary embodiment, each side longitudinal member 12 may be a side sill reinforcement received in the side sill inner 13 of each side sill, and the side longitudinal member 12 may be an extruded product manufactured by an extrusion process.

Figure 5:
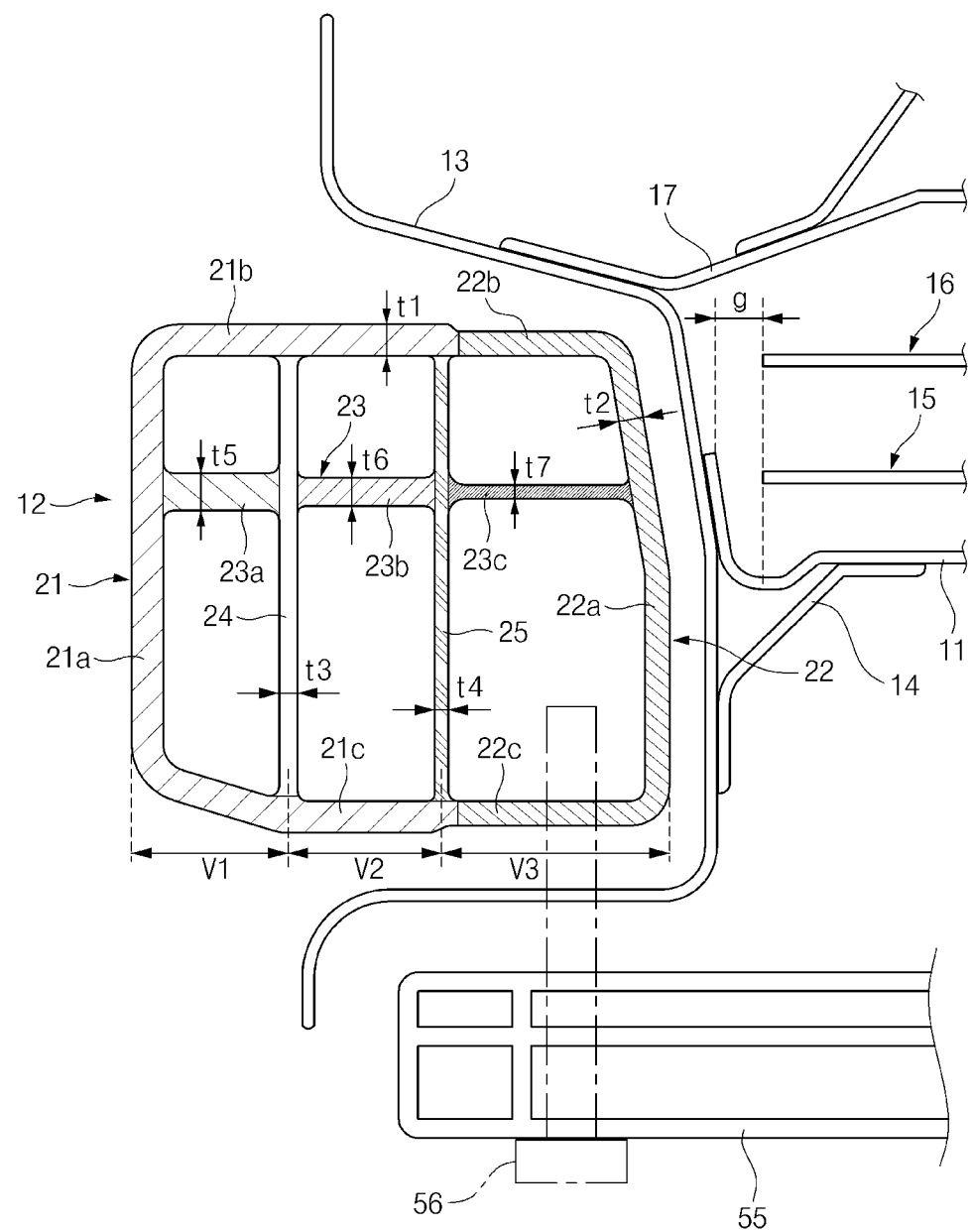
FIG. 5 illustrates an enlarged view of portion C of FIG. 3.

Referring to FIGS. 3 and 5, each side longitudinal member 12 may include an exterior portion 21 facing the exterior of the vehicle, and an interior portion 22 facing the interior of the vehicle.

Referring to FIG. 5, the exterior portion 21 may include an exterior side wall 21a facing the exterior of the vehicle, an exterior top wall 21b facing the top of the vehicle, and an exterior bottom wall 21c facing the bottom of the vehicle. The interior portion 22 may include an interior side wall 22a facing the interior of the vehicle, an interior top wall 22b facing the top of the vehicle, and an interior bottom wall 22C facing the bottom of the vehicle.

Referring to FIG. 5, each side longitudinal member 12 may include a horizontal rib 23 provided horizontally therein, and a plurality of vertical ribs 24 and 25 provided vertically therein. The side longitudinal member 12 may include a plurality of cavities defined by the horizontal rib 23 and the plurality of vertical ribs 24 and 25. The horizontal rib 23 may extend horizontally between the exterior portion 21 and the interior portion 22. That is, the horizontal rib 23 may extend in a width or transverse direction of the vehicle. Specifically, the horizontal rib 23 may extend horizontally to connect between the exterior side wall 21a and the interior side wall 22a. The plurality of vertical ribs 24 and 25 may include a first vertical rib 24 adjacent to the exterior side wall 21a of the exterior portion 21, and a second vertical rib 25 adjacent to the interior side wall 22a of the interior portion 22. The second vertical rib 25 may be spaced apart from the first vertical rib 24 toward the interior of the vehicle. A top end of the second vertical rib 25 may be attached to a connection portion between the exterior top wall 21b and the interior top wall 22b, and a bottom end of the second vertical rib 25 may be attached to a connection portion between the exterior bottom wall 21c and the interior bottom wall 22C.

Referring to FIG. 5, the horizontal rib 23 may include a first horizontal rib 23a horizontally connecting the exterior side wall 21a and the first vertical rib 24, a second horizontal rib 23b horizontally connecting the first vertical rib 24 and the second vertical rib 25, and a third horizontal rib 23c horizontally connecting the second vertical rib 25 and the interior side wall 22a.

The strength of the side longitudinal member 12 may increase from the interior side thereof toward the exterior side thereof, and accordingly the thickness of the side longitudinal member 12 may increase from the interior side thereof toward the exterior side thereof. Referring to FIG. 5, a thickness t1 of the exterior portion 21 may be greater than a thickness t2 of the interior portion 22, and a thickness t3 of the first vertical rib 24 may be greater than a thickness t4 of the second vertical rib 25. A thickness t5 of the first horizontal rib 23a may be greater than a thickness t6 of the second horizontal rib 23b, and the thickness t6 of the second horizontal rib 23b may be greater than a thickness t7 of the third horizontal rib 23c. For example, the thickness t1 of the exterior portion 21 may be 5 mm, and the thickness t2 of the interior portion 22 may be 3.5 mm. The thickness t3 of the first vertical rib 24 may be 3 mm, and the thickness t4 of the second vertical rib 25 may be 2.5 mm. The thickness t5 of the first horizontal rib 23a may be 4 mm, the thickness t6 of the second horizontal rib 23b may be 3.5 mm, and the thickness t7 of the third horizontal rib 23c may be 3 mm.

Referring to FIG. 5, the side longitudinal member 12 may be divided into a first closed cross section V1, a second closed cross section V2, and a third closed cross section V3 in a width or transverse direction thereof. The first closed cross section V1 may be defined between the exterior portion 21 and the first vertical rib 24, the second closed cross section V2 may be defined between the first vertical rib 24 and the second vertical rib 25, and the third closed cross section V3 may be defined between the second vertical rib 25 and the interior portion 22. The strength of the first closed cross section V1 may be higher than that of the second closed cross section V2, and the strength of the second closed cross section V2 may be higher than that of the third closed cross section V3. The third closed cross section V3 may have the lowest strength. Accordingly, during a side collision of the vehicle, when impact energy is transferred to the first closed cross section V1, the second closed cross section V2, and the third closed cross section V3, the first closed cross section V1 may be less deformed, the second closed cross section V2 may be more deformed than the first closed cross section V1, and the third closed cross section V3 may be significantly deformed. That is, as the strength of the side longitudinal member 12 increases from the interior side thereof toward the exterior side thereof, the side longitudinal member 12 may be sequentially deformed by the impact energy, and thus it may stably absorb the impact energy.

Referring to FIG. 3, a structural transverse member 15 may be attached to the floor 11, and the structural transverse member 15 may extend in the width or transverse direction of the vehicle. The structural transverse member 15 may be aligned with the horizontal rib 23 of the side longitudinal member 12 in the width or transverse direction of the vehicle.

Figure 4:
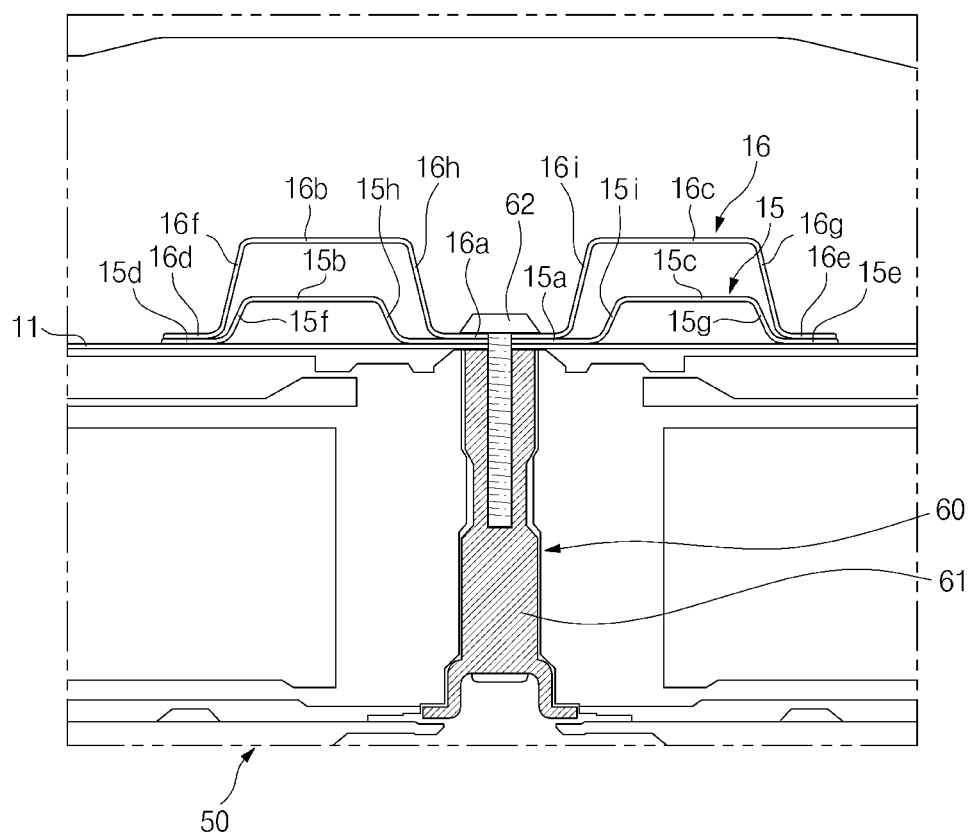
FIG. 4 illustrates a cross-sectional view, taken along line B-B of FIG. 3.

Referring to FIG. 4, the structural transverse member 15 may have an M-shaped cross section, and accordingly the structural transverse member 15 may have enough strength and stiffness. The cross section of the structural transverse member 15 may have the same shape and size in the width or transverse direction of the vehicle. The structural transverse member 15 may include a central web 15a, and first and second side webs 15b and 15c located symmetrically on both sides of the central web 15a.

The central web 15a may be flat to match a top surface of the floor 11, and the central web 15a may be attached to the floor 11 using fasteners, welding, and/or the like.

The first side web 15b and the second side web 15c may be offset upwardly with respect to the central web 15a, and the central web 15a and the first and second side webs 15b and 15c may extend along a longitudinal direction of the structural transverse member 15. The first side web 15b and the second side web 15c may be flat.

A first edge of the central web 15a may be connected to the first side web 15b through a first interior side wall 15h, and a second edge of the central web 15a may be connected to the second side web 15c through a second interior side wall 15i. The first interior side wall 15h may be inclined from the central web 15*a* toward the first side web 15*b*, and the second interior side wall 15*i* may be inclined from the central web 15*a* toward the second side web 15*c*.

The structural transverse member 15 may include a first flange 15*d* connected to the first side web 15*b* through a first exterior side wall 15*f*, and a second flange 15*e* connected to the second side web 15*c* through a second exterior side wall 15*g*. The first flange 15*d* and the second flange 15*e* of the structural transverse member 15 may be fixed to the top surface of the floor 11 using fasteners, welding, and/or the like. The first exterior side wall 15*f* may be inclined from the first side web 15*b* toward the first flange 15*d*, and the second exterior side wall 15*g* may be inclined from the second side web 15*c* toward the second flange 15*e*.

The horizontal rib 23 of each side longitudinal member 12 may be aligned with the first side web 15*b* and the second side web 15*c* of the structural transverse member 15 in the width or transverse direction of the vehicle. Accordingly, the pair of side longitudinal members 12 and the structural transverse member 15 may increase transverse stiffness and transverse strength of the vehicle body.

In particular, the horizontal rib 23 of the side longitudinal member 12 may be horizontally aligned with the structural transverse member 15 so that the horizontal rib 23 of the side longitudinal member 12 and the structural transverse member 15 may sufficiently support the impact energy (impact load) transferred in the width or transverse direction of the vehicle during a side collision of the vehicle, and thus side crash performance (crashworthiness) of the floor 11 may be improved.

Referring to FIGS. 3 and 4, the vehicle floor system according to an exemplary embodiment of the present disclosure may further include an additional transverse member 16 disposed above the structural transverse member 15. The additional transverse member 16 may extend in the width or transverse direction of the vehicle, and a longitudinal axis of the additional transverse member 16 may be parallel to a longitudinal axis of the structural transverse member 15. For example, the longitudinal axis of the additional transverse member 16 may coincide with the longitudinal axis of the structural transverse member 15. A cross section of the additional transverse member 16 may have the same shape and size in the width or transverse direction of the vehicle. The additional transverse member 16 may have an M-shaped cross section similar to that of the structural transverse member 15, and the size of the additional transverse member 16 may be greater than that of the structural transverse member 15.

Referring to FIG. 4, the additional transverse member 16 may include a central web 16*a*, and first and second side webs 16*b* and 16*c* located symmetrically on both sides of the central web 16*a*. The first side web 16*b* and the second side web 16*c* may be offset upwardly with respect to the central web 16*a*, and the central web 16*a* and the first and second side webs 16*b* and 16*c* may extend along a longitudinal direction of the additional transverse member 16. The central web 16*a* of the additional transverse member 16 may be flat to match a top surface of the central web 15*a* of the structural transverse member 15, and the central web 16*a* of the additional transverse member 16 may be fixed to the central web 15*a* of the structural transverse member 15 using fasteners, welding, and/or the like.

A first edge of the central web 16*a* may be connected to the first side web 16*b* through a first interior side wall 16*h*, and a second edge of the central web 16*a* may be connected to the second side web 16*c* through a second interior side wall 16*i*. The first interior side wall 16*h* may be inclined from the central web 16*a* toward the first side web 16*b*, and the second interior side wall 16*i* may be inclined from the central web 16*a* toward the second side web 16*c*.

The first side web 16*b* of the additional transverse member 16 may be spaced apart upwardly from the first side web 15*b* of the structural transverse member 15, and the second side web 16*c* of the additional transverse member 16 may be spaced apart upwardly from the second side web 15*c* of the structural transverse member 15.

The additional transverse member 16 may include a first flange 16*d* connected to the first side web 16*b* through a first exterior side wall 16*f*, and a second flange 16*e* connected to the second side web 16*c* through a second exterior side wall 16*g*. The first exterior side wall 16*f* may be inclined from the first side web 16*b* toward the first flange 16*d*, and the second exterior side wall 16*g* may be inclined from the second side web 16*c* toward the second flange 16*e*.

The first flange 16*d* of the additional transverse member 16 may be flat to match the first flange 15*d* of the structural transverse member 15, and the first flange 16*d* of the additional transverse member 16 may be fixed to the first flange 15*d* of the structural transverse member 15 using fasteners, welding, and/or the like. The second flange 16*e* of the additional transverse member 16 may be flat to match the second flange 15*e* of the structural transverse member 15, and the second flange 16*e* of the additional transverse member 16 may be fixed to the second flange 15*e* of the structural transverse member 15 using fasteners, welding, and/or the like.

The first side web 16*b* and the second side web 16*c* of the additional transverse member 16 may be aligned with the top wall of the side longitudinal member 12 in the width or transverse direction of the vehicle. Accordingly, the pair of side longitudinal members 12 and the additional transverse member 16 may increase transverse stiffness and transverse strength of the vehicle body.

In particular, the top wall of the side longitudinal member 12 may be horizontally aligned with the additional transverse member 16 so that the top wall of the side longitudinal member 12 and the additional transverse member 16 may sufficiently support the impact energy (impact load) transferred in the width or transverse direction of the vehicle during a side collision of the vehicle.

A cavity may be formed between the additional transverse member 16 and the structural transverse member 15, and the additional transverse member 16 may be attached to the structural transverse member 15 so that the additional transverse member 16 and the structural transverse member 15 may form a closed cross section. Thus, the additional transverse member 16 and the structural transverse member 15 may increase strength and stiffness of the vehicle body.

According to an exemplary embodiment, the additional transverse member 16 and the structural transverse member 15 may be made of the same or similar material, and the additional transverse member 16 and the structural transverse member 15 may be manufactured by the same manufacturing process. The additional transverse member 16 may be fixed to the structural transverse member 15 using fasteners, welding, and/or the like so that the additional transverse member 16 and the structural transverse member 15 may be integrally joined.

According to another exemplary embodiment, the additional transverse member 16 may be manufactured together with the structural transverse member 15 by casting, extruding, and/or the like so that the additional transverse member 16 and the structural transverse member 15 may form a unitary one-piece structure. Accordingly, a material of the additional transverse member 16 may be the same as that of the structural transverse member 15.

For example, since the structural transverse member 15 is located below the additional transverse member 16, it may be referred to as a lower transverse member, and since the additional transverse member 16 is located above the structural transverse member 15, it may be referred to as an upper transverse member.

Referring to FIG. 1, both end portions of the additional transverse member 16 may be fixed to the pair of side sill inners 13 through a pair of end brackets 17, respectively. Referring to FIG. 3, each end portion of the additional transverse member 16 may be fixed to the corresponding side sill inner 13 through the corresponding end bracket 17. Each end bracket 17 may include a first flange 17a fixed to the side sill inner 13 using fasteners, welding, and/or the like, and a second flange 17b fixed to the end portion of the additional transverse member 16 using fasteners, welding, and/or the like.

According to an exemplary embodiment, each end portion of the structural transverse member 15 and each end portion of the additional transverse member 16 may be directly attached to the corresponding side sill inner 13.

According to another exemplary embodiment, when it is difficult to form the structural transverse member 15 and the additional transverse member 16, each end portion of the structural transverse member 15 and each end portion of the additional transverse member 16 may be spaced apart from the adjacent side sill inner 13 by a predetermined minimum gap g as illustrated in FIGS. 3 and 5. In particular, the gap g between the end portion of each of the transverse members 15 and 16 and the side sill inner 13 needs to be minimized to 10 mm or less.

Referring to FIG. 3, a battery assembly 50 may be disposed under the floor 11, and the battery assembly 50 may include a battery case 51 in which a plurality of battery cells are received, and a battery cover 52 with which a top opening of the battery case 51 is covered.

The battery assembly 50 may include one or more battery transverse members 53 disposed in the battery case 51, and the battery transverse member 53 may extend in a width or transverse direction of the battery case 51.

The battery assembly 50 may include a pair of side mounts 55 each protruding from an exterior side surface of the battery case 51 toward the corresponding side sill inner 13 and the corresponding side longitudinal member 12. Each side mount 55 may be made of an aluminum material, and the side mount 55 may be joined to the corresponding side longitudinal member 12 through a side mounting bolt 56. The side mount 55 may be aligned with the battery transverse member 53 in the width or transverse direction of the vehicle.

Referring to FIG. 2, the battery assembly 50 may be mounted to the floor 11 of the vehicle body through a plurality of fasteners 6o. According to an exemplary embodiment, each fastener 60 may directly connect the battery assembly 50 and the structural transverse member 15. Referring to FIGS. 3 and 4, each fastener 60 may include a nut 61 and a bolt 62. The battery assembly 50 may be mounted on the floor 11 of the vehicle body through the plurality of nuts 61 and the plurality of bolts 62. Each nut 61 may extend through the battery assembly 50, and a top end of the nut 61 may be supported to a bottom surface of the floor 11. Each bolt 62 may be screwed into the corresponding nut 61 to join the floor 11 and the battery assembly 50. Threads of the bolt 62 may extend through the structural transverse member 15 and the floor 11, and a head of the bolt 62 may be seated on the structural transverse member 15. Referring to FIG. 4, the head of the bolt 62 may be mounted on the top surface of the central web 15a of the structural transverse member 15. Accordingly, the plurality of fasteners 60 may firmly connect the battery assembly 50 and the structural transverse member 15.

Referring to FIG. 2, the pair of side sill inners 13 may be spaced apart from each other by a predetermined distance L, and the plurality of fasteners 60 may be mounted in a predetermined position which is offset from each side sill inner 13. In particular, the mounting position of each of the fasteners 60 may be ⅓ of the distance L between the pair of side sill inners 13. That is, the plurality of fasteners 60 may substantially connect the battery assembly 50 and the structural transverse member 15 at predetermined points (e.g., ⅓ of the distance L between the pair of side sill inners 13), thereby preventing the floor 11, the structural transverse member 15, and the battery transverse member 53 from being deformed (bent) in the event of a side collision of the vehicle, and preventing the battery assembly 50 from coming off or being separated from the floor 11, thus ensuring safety of the battery assembly 50.

Referring to FIG. 3, a deformation section S may be defined between an exterior side surface of each side longitudinal member 12 and the exterior side surface of the battery case 51 of the battery assembly 50, and a support section T may be defined in an interior space of the battery case 51 of the battery assembly 50. The deformation section S may be divided into a first section S1 and a second section S2, and the first section S1 may correspond to a width of the exterior portion 21 of each side longitudinal member 12. Since the exterior portion 21 of the side longitudinal member 12 has the greatest thickness, the first section S1 may have relatively high strength. The second section S2 may be an overlapping section of the interior portion 22 of each side longitudinal member 12 and each side mount 55 of the battery assembly 50. In particular, a portion of the second closed cross section V2 and the third closed cross section V3 of the side longitudinal member 12 may overlap the side mount 55 of the battery assembly 50. Since the thickness of the interior portion 22 of the side longitudinal member 12 is less than the thickness of the exterior portion 21 thereof, the strength of the second section S2 may be lower than that of the first section S1. The structural transverse member 15 and the battery transverse member 53 may overlap each other in the support section T so that the structural transverse member 15 and the battery transverse member 53 may effectively support the impact energy generated during a side collision of the vehicle. When the impact energy is sequentially transferred to the deformation section S and the support section T during the side collision of the vehicle, the first section S1 may primarily support the impact energy to absorb approximately 30% of the impact energy. Since the strength of the first section S1 is higher than that of the second section S2, the second section S2 may be more deformed than the first section S1. In particular, the side mount 55 of the battery assembly 50 may be horizontally aligned with the battery transverse member 53 so that during the side collision of the vehicle, the side mount 55 of the battery assembly 50 may be bent to a V-shape while the portion of the second closed cross section V2 and the third closed cross section V3 of the side longitudinal member 12 are deformed, and accordingly the second section S2 may be much more deformed than the first section S1, thereby absorbing most of the remaining impact energy. That is, during the side collision of the vehicle, the deformation section S may be sufficiently deformed to appropriately absorb the impact energy, and the support section T may absorb and support the remaining impact energy.

As described above, the side longitudinal member 12 may have different strength for each section, and the battery transverse member 53 and the structural transverse member 15 may overlap vertically, thereby absorbing and supporting the impact energy during the side collision, thus sufficiently securing the safety of the battery assembly 50. In particular, the horizontal rib 23 of the side longitudinal member 12 may be aligned with the first and second side webs 15b and 15c of the structural transverse member 15 in the width or transverse direction of the vehicle so that the structural transverse member 15 may increase an absorption rate of impact energy at the initial stage of the side collision.

Figure 6:
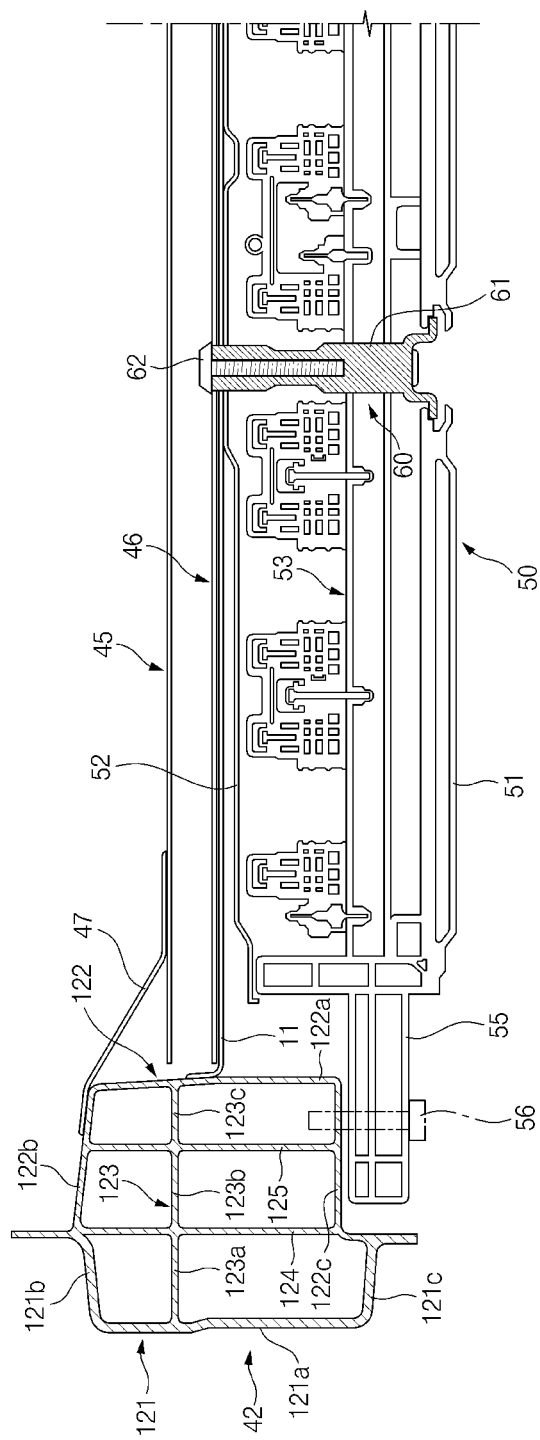
FIG. 6 illustrates a cross-sectional view of a vehicle floor system according to another exemplary embodiment of the present disclosure.

FIG. 6 illustrates a vehicle floor system according to another exemplary embodiment of the present disclosure. Referring to FIG. 6, each side longitudinal member 42 may have a structure in which a side sill including a side sill inner and a side sill outer and a side sill reinforcement are joined. Each side longitudinal member 42 may be mounted on each side edge of the floor 11, and the side longitudinal member 42 may extend in the longitudinal direction of the vehicle. A structural transverse member 45 may be disposed above the floor 11, and the structural transverse member 45 may extend in the width or transverse direction of the vehicle. Each end portion of the structural transverse member 45 may be mounted to the corresponding side longitudinal member 42 through an end bracket 47. The vehicle floor system may further include an additional transverse member 46 located below the structural transverse member 45, and the additional transverse member 46 may be fixed to the top surface of the floor 11 using fasteners, welding, and/or the like. The additional transverse member 46 may be disposed between the structural transverse member 45 and the floor 11. The structural transverse member 45 may be attached to the additional transverse member 46 using fasteners, welding, and/or the like, and a cavity may be formed between the structural transverse member 45 and the additional transverse member 46 so that the structural transverse member 45 and the additional transverse member 46 may form a closed cross section. Thus, the additional transverse member 46 and the structural transverse member 45 may increase strength and stiffness of the vehicle body. Each fastener 60 may connect the battery assembly 50 and the additional transverse member 46.

In the exemplary embodiment illustrated in FIG. 6, since the structural transverse member 45 is located above the additional transverse member 46, it may be referred to as an upper transverse member, and since the additional transverse member 46 is located below the structural transverse member 45, it may be referred to as a lower transverse member.

Referring to FIG. 6, each side longitudinal member 42 may include an exterior portion 121 facing the exterior of the vehicle, and an interior portion 122 facing the interior of the vehicle. The exterior portion 121 may include an exterior side wall 121a facing the exterior of the vehicle, an exterior top wall 121b facing the top of the vehicle, and an exterior bottom wall 121C facing the bottom of the vehicle. The interior portion 122 may include an interior side wall 122a facing the interior of the vehicle, an interior top wall 122b facing the top of the vehicle, and an interior bottom wall 122C facing the bottom of the vehicle. The side longitudinal member 42 may include a horizontal rib 123 provided horizontally therein, and a plurality of vertical ribs 124 and 125 provided vertically therein. The side longitudinal member 42 may include a plurality of cavities defined by the horizontal rib 123 and the plurality of vertical ribs 124 and 125. The horizontal rib 123 may extend horizontally to connect between the exterior side wall 121a and the interior side wall 122a. The plurality of vertical ribs 124 and 125 may include a first vertical rib 124 adjacent to the exterior side wall 121a, and a second vertical rib 125 adjacent to the interior side wall 122a. The second vertical rib 125 may be spaced apart from the first vertical rib 124 toward the interior of the vehicle. The horizontal rib 123 may include a first horizontal rib 123a horizontally connecting the exterior side wall 121a and the first vertical rib 124, a second horizontal rib 123b, horizontally connecting the first vertical rib 124 and the second vertical rib 125, and a third horizontal rib 123c horizontally connecting the second vertical rib 125 and the interior side wall 122a. The horizontal rib 123 of the side longitudinal member 42 may be aligned with the structural transverse member 45 in the width or transverse direction of the vehicle.

The other elements in this exemplary embodiment may be similar to or the same as those in the exemplary embodiment illustrated in FIGS. 1 to 5.

Figure 7:
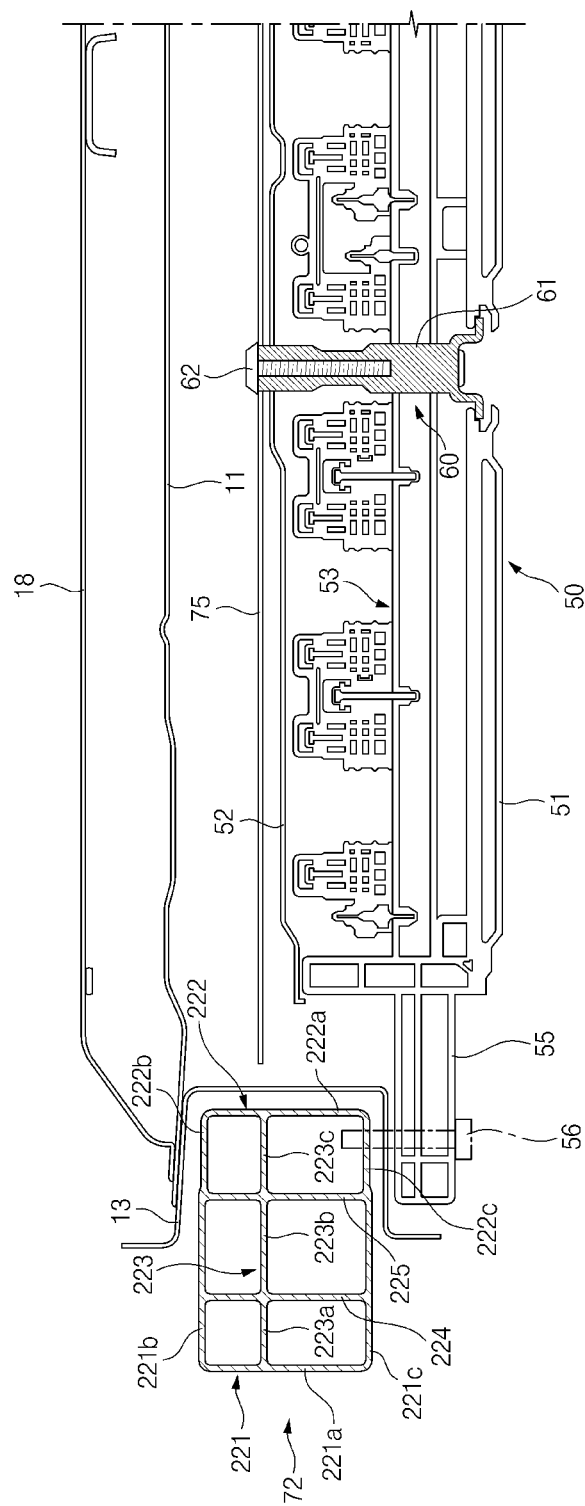
FIG. 7 illustrates a cross-sectional view of a vehicle floor system according to another exemplary embodiment of the present disclosure.

FIG. 7 illustrates a vehicle floor system according to another exemplary embodiment of the present disclosure. Referring to FIG. 7, each side longitudinal member 72 may be received in the side sill inner 13 of the side sill, and the side longitudinal member 72 may extend in the longitudinal direction of the vehicle. A structural transverse member 75 may be disposed below the floor 11, and the structural transverse member 75 may extend n the width or transverse direction of the vehicle. A seat cross member 18 may be attached to the top surface of the floor 11, and the seat crossmember 18 may extend in the width or transverse direction of the vehicle. A vehicle seat may be mounted on the seat crossmember 18 through a plurality of brackets. Each end portion of the structural transverse member 75 may be directly mounted on an inboard side surface of the side sill inner 13 using fasteners, welding, and/or the like. Each fastener 60 may directly connect the battery assembly 50 and the structural transverse member 75.

Referring to FIG. 7, each side longitudinal member 72 may include an exterior portion 221 facing the exterior of the vehicle, and an interior portion 222 facing the interior of the vehicle. The exterior portion 221 may include an exterior side wall 221a facing the exterior of the vehicle, an exterior top wall 221b facing the top of the vehicle, and an exterior bottom wall 221C facing the bottom of the vehicle. The interior portion 222 may include an interior side wall 222a facing the interior of the vehicle, an interior top wall 222b facing the top of the vehicle, and an interior bottom wall 222C facing the bottom of the vehicle. The side longitudinal member 72 may include a horizontal rib 223 provided horizontally therein, and a plurality of vertical ribs 224 and 225 provided vertically therein. The side longitudinal member 72 may include a plurality of cavities defined by the horizontal rib 223 and the plurality of vertical ribs 224 and 225. The horizontal rib 223 may extend horizontally to connect between the exterior side wall 221a and the interior side wall 222a. The plurality of vertical ribs 224 and 225 may include a first vertical rib 224 adjacent to the exterior side wall 221a, and a second vertical rib 225 adjacent to the interior side wall 222a. The second vertical rib 225 may be spaced apart from the first vertical rib 224 toward the interior of the vehicle. The horizontal rib 223 may include a first horizontal rib 223a horizontally connecting the exterior side wall 221a and the first vertical rib 224, a second horizontal rib 223b horizontally connecting the first vertical rib 224 and the second vertical rib 225, and a third horizontal rib 223c horizontally connecting the second vertical rib 225 and the interior side wall 222a. The horizontal rib 223 of the side longitudinal member 72 may be aligned with the structural transverse member 75 in the width or transverse direction of the vehicle.

The other elements in this exemplary embodiment may be similar to or the same as those in the exemplary embodiment illustrated in FIGS. 1 to 5.

As set forth above, according to exemplary embodiments of the present disclosure, the side longitudinal member may have a different strength for each section, and the battery transverse member and the structural transverse member may overlap vertically, thereby absorbing and supporting the impact energy during a side collision of the vehicle, thus sufficiently securing the safety of the battery assembly. In particular, the horizontal rib of the side longitudinal member may be aligned with the structural transverse member in the width or transverse direction of the vehicle so that the structural transverse member may increase the absorption rate of impact energy at the initial stage of the side collision.

According to exemplary embodiments of the present disclosure, the structural members of the vehicle such as the floor, the side longitudinal members, the structural transverse member, and the additional transverse member may be manufactured by a process that can improve stiffness and/or strength such as hot stamping, hot forming, press hardening, and/or roll forming. Thus, each structural member may have a cross section with increased bending stiffness against a lateral load acting on the side of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle floor system comprising:
a floor;
a pair of side longitudinal members disposed on side edges of the floor, respectively, wherein each side longitudinal member extends in a longitudinal direction of a vehicle and wherein each side longitudinal member comprises a horizontal rib provided therein and wherein a thickness of each side longitudinal member increases from an interior side thereof toward an exterior side thereof;
a structural transverse member disposed on the floor and extending in a transverse direction of the vehicle, wherein the horizontal ribs are aligned with the structural transverse member in the transverse direction of the vehicle; and
a battery assembly disposed under the floor.

2. The vehicle floor system according to claim 1, wherein the structural transverse member comprises:
a central web;
a first side web connected to the central web through a first interior side wall;
a second side web connected to the central web through a second interior side wall;
a first flange connected to the first side web through a first exterior side wall; and
a second flange connected to the second side web through a second exterior side wall.

3. The vehicle floor system according to claim 2, wherein:
the central web, the first flange, and the second flange are fixed to a top surface of the floor; and
the first side web and the second side web are offset upwardly with respect to the central web.

4. The vehicle floor system according to claim 3, wherein the first side web and the second side web are aligned with the horizontal rib of the corresponding side longitudinal member in the transverse direction of the vehicle.

5. The vehicle floor system according to claim 1, further comprising an additional transverse member disposed above the structural transverse member, wherein a top wall of each side longitudinal member is aligned with the additional transverse member in the transverse direction of the vehicle.

6. The vehicle floor system according to claim 5, wherein the additional transverse member is attached to the structural transverse member such that the additional transverse member and the structural transverse member define a closed cross section.

7. The vehicle floor system according to claim 5, wherein:
the side longitudinal member is directly mounted on the corresponding side edge of the floor;
the structural transverse member is disposed above the floor; and
the additional transverse member is disposed between the structural transverse member and the floor.

8. The vehicle floor system according to claim 7, further comprising a plurality of fasteners directly connecting the battery assembly to the additional transverse member.

9. The vehicle floor system according to claim 1, wherein:
the structural transverse member is disposed below the floor; and
a plurality of fasteners directly connect the battery assembly and the structural transverse member.

10. A vehicle floor system comprising:
a floor;
a pair of side longitudinal members disposed on both side edges of the floor, respectively, wherein each side longitudinal member extends in a longitudinal direction of a vehicle, and wherein each side longitudinal member comprises:
a horizontal rib provided therein;
an exterior portion facing an exterior of the vehicle; and
an interior portion facing an interior of the vehicle, wherein a thickness of the exterior portion is greater than a thickness of the interior portion;
a structural transverse member disposed on the floor and extending in a transverse direction of the vehicle, wherein the horizontal ribs are aligned with the structural transverse member in the transverse direction of the vehicle; and
a battery assembly disposed under the floor.

11. The vehicle floor system according to claim 10, wherein:
each side longitudinal member comprises a plurality of vertical ribs extending vertically therein;
the plurality of vertical ribs include a first vertical rib adjacent to the exterior portion and a second vertical rib adjacent to the interior portion; and
a thickness of the first vertical rib is greater than that of the second vertical rib.

12. The vehicle floor system according to claim 10, wherein:
the battery assembly comprises a battery case configured to receive a plurality of battery cells, a battery cover configured to cover the battery case, a battery transverse member disposed in the battery case, and a side mount protruding from an exterior side surface of the battery case toward a side sill and the corresponding side longitudinal member;

the side mount is joined to the corresponding side longitudinal member through a side mounting bolt; and the side mount is aligned with the battery transverse member in the transverse direction of the vehicle.

13. The vehicle floor system according to claim 12, wherein at least a portion of the corresponding side longitudinal member overlaps the side mount of the battery assembly.

14. The vehicle floor system according to claim 13, wherein:

a deformation section is defined between an exterior side surface of the corresponding side longitudinal member and the exterior side surface of the battery case; and the deformation section comprises a first section corresponding to a width of the exterior portion of the corresponding side longitudinal member and a second section in which the interior portion of the corresponding side longitudinal member and the side mount overlap vertically.

15. The vehicle floor system according to claim 12, further comprising a plurality of fasteners, wherein:

the battery assembly is mounted to the floor through the plurality of fasteners; and each fastener is mounted in a predetermined position which is one-third of a distance between a pair of side sills.

16. The vehicle floor system according to claim 15, wherein the battery assembly is directly connected to the structural transverse member by the plurality of fasteners.

17. A vehicle comprising:

a floor;

a pair of side longitudinal members disposed on both side edges of the floor, respectively, wherein each side longitudinal member extends in a longitudinal direction of the vehicle, and wherein each side longitudinal member comprises a horizontal rib provided therein;

a structural transverse member disposed below the floor and extending in a transverse direction of the vehicle, wherein the horizontal rib is aligned with the structural transverse member in the transverse direction of the vehicle; and a battery assembly mounted under the floor and directly connected to the structural transverse member by a plurality of fasteners, the battery assembly comprising a battery case, a plurality of battery cells disposed in the battery case, a battery cover configured to cover the battery case, a battery transverse member disposed in the battery case, and a side mount protruding from an exterior side surface of the battery case toward a side sill.

18. The vehicle according to claim 17, wherein a thickness of each side longitudinal member increases from an interior side thereof toward an exterior side thereof.

19. The vehicle according to claim 17, wherein the structural transverse member comprises:

a central web;

a first side web connected to the central web through a first interior side wall;

a second side web connected to the central web through a second interior side wall;

a first flange connected to the first side web through a first exterior side wall; and a second flange connected to the second side web through a second exterior side wall;

wherein the central web, the first flange, and the second flange are fixed to a top surface of the floor; and wherein the first side web and the second side web are offset upwardly with respect to the central web.

20. The vehicle according to claim 19, wherein a thickness of each side longitudinal member increases from an interior side thereof toward an exterior side thereof.

* * * * *